United States Patent [19]
Silver

[11] 3,787,990
[45] Jan. 29, 1974

[54] STRIP-CHART HOLDER

[76] Inventor: Frederick Silver, 430 Tillou Rd., South Orange, N.J. 07079

[22] Filed: Mar. 3, 1972

[21] Appl. No.: 231,492

[52] U.S. Cl. .................................. 40/86 R, 35/40
[51] Int. Cl. ............................................ G09f 11/29
[58] Field of Search ...................... 40/86 R; 35/40

[56] References Cited
UNITED STATES PATENTS

| 1,664,511 | 4/1928 | Isbell | 40/86 R |
| 1,860,772 | 5/1932 | Dorion | 40/86 R |
| 1,708,479 | 4/1929 | MacDonald | 40/86 R |
| 641,283 | 1/1900 | Evans | 40/35 |
| 2,203,053 | 6/1940 | Hines | 40/86 |
| 1,711,850 | 5/1929 | Lake | 40/86 |
| 2,752,705 | 7/1956 | Ebersold | 40/86 |

FOREIGN PATENTS OR APPLICATIONS 275,180    7/1951    Switzerland .......................... 35/7 A Primary Examiner—Robert W. Michell
Assistant Examiner—J. H. Wolff
Attorney, Agent, or Firm—Popper, Bain, Bobis, Gilfillan & Rhodes

[57] ABSTRACT

A holder for a roll-up strip-chart providing right side and left side rotatable rods for rolling up the strip-chart and transferring it from the right side to the left side of a board, the board being provided with a cork surface and overhanging stub-retainers to hold the strip-chart down, and a cork surface on the board that is receptive to the insertion of marker pins that may be inserted in the strip-chart to designate position and progress of the vehicle for which the chart is in use.

1 Claim, 3 Drawing Figures

PATENTED JAN 29 1974　　　　　　　　　　3,787,990

STRIP-CHART HOLDER

BACKGROUND OF INVENTION

1. Field of Invention

This invention relates generally to holders for roll-up strip-charts, and particularly to such devices having means for transferring the roll-up charts from one side to another and a base receptive to pin markers.

2. Prior Art

Navigators are frequently provided with long charts upon which they desire to mark their position and progress. Aerial navigation aids are known (Hage U.S. Pat. No. 2,619,740) wherein a transparent case provides a means for transferring the strip map over the case from roller to roller. No provision is made for applying progress markers other than to mark the chart itself in most of these devices.

Other devices utilize magnets to indicate areas on the map where a vehicle is located or a course to be traversed (Breer U.S. Pat. No. 2,761,413).

SUMMARY OF INVENTION

It has been found that a roller-type chart of considerable length may be displayed on a base with an expanse of territory or water disposed on the base so disposed that position markers or pins can be applied to the base, to pierce the map so as to designate a course of travel, either already accomplished or a plotted course to be accomplished; colored markers may be used signifying different aspects of the course. In addition, the colored markers keep the portion of the strip-chart anchored in place (markers such as Moore's "push pins" are suitable). Thus for the navigator, the point of origin can be designated by a yellow pin for example, the objective can be designated by a blue pin, changes of course can be designated in advance by red pins, a colored thread can be strung between the course of marker pins, and the position and progress indicated by white pins. This is attainable by the use of a chart base receptive to the insertion of sharp pointed pins.

DRAWINGS

These objects and advantages as well as other objects and advantages may be attained by the device shown by way of illustration in the drawings in which.

PREFERRED EMBODIMENT

Figure 1:
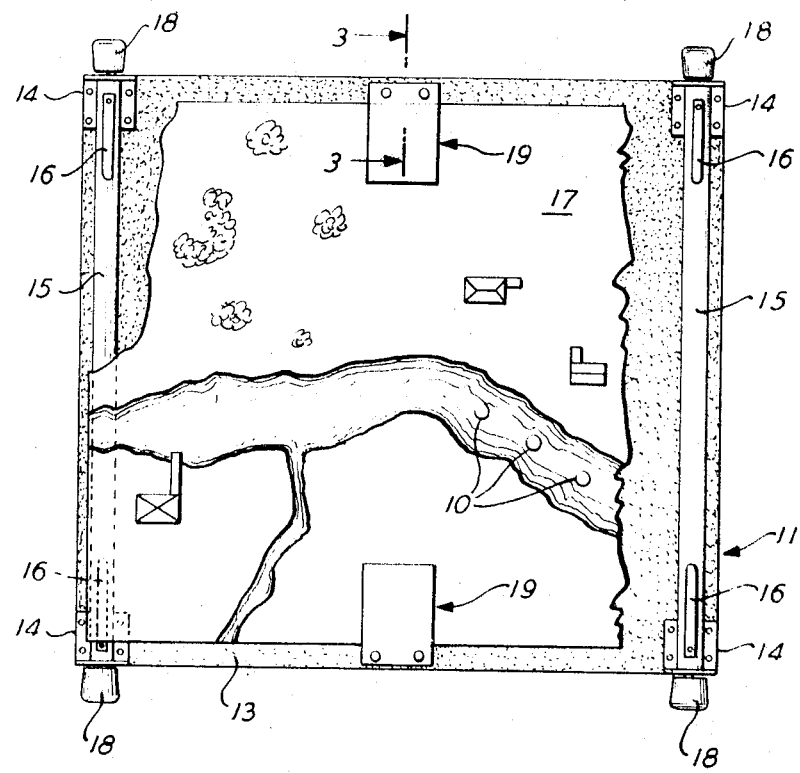
FIG. 1 is a top plan view of a strip-chart holder showing a portion of a chart partially in transit from one rod chart carrier to another chart carrier.
Figure 2:
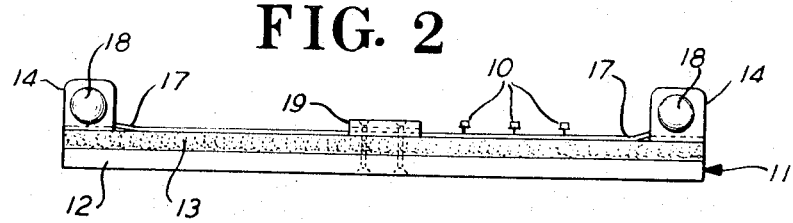
FIG. 2 is a side elevational view thereof.
Figure 3:
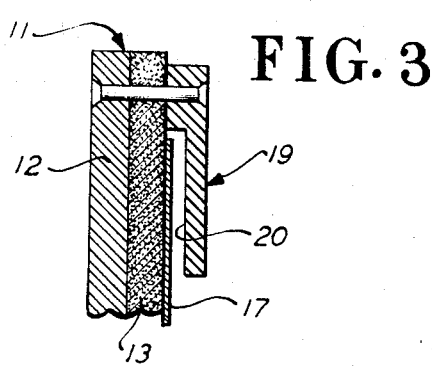
FIG. 3 is a partial sectional view of the chart holder taken on the line 3—3 in FIG. 1, looking in the direction of the arrows.

The strip chart holder provides a two-layer laminated, rectangular, flat base 11. The bottom lamination is a rigid, piece 12 preferably metal, plastic or wood. The top surface or lamination 13 is a relatively soft material, easily penetrable by marker-pins 10, and is preferably cork. The laminations 12, 13 are secured together by an appropriate glue or adhesive. Four brackets 14 are provided, one attached at each corner of the base 11. The brackets 14 are L-shaped and are attached to the base 11 by rivets. The brackets 14 have circular openings to receive rotatable rods 15, one at each side of the base 11. The rods 15 have resilient clips 16 attached thereto close to the brackets 14. The clips 16 will secure the opposite ends of a long strip roll-chart 17. The rods 15 are provided with knobs 18 at each end that make them easy to rotate. At the center line of the base 11, transparent retainers 19, 19 are riveted to the base, one at the top and one at the bottom. The inner ends of the retainers have an undercut 20 to allow the chart 17 to freely slide under the retainers 19. The retainers 19 are sufficiently long to overlap the top and bottom edges of the roll-chart 17 and keep it lying flat on the top lamination 13. The roll chart 17 may be unwound from the right rod to the left rod and back again. The retainers 19, 19 though long enough to hold the chart 17 down at the center, are short enough not to interfere with most of the marking, charting and observing navigation course on the chart and marking it with pins 10 to show position and progress.

I claim:

1. A navigational chart holder comprising:
   a. a generally flat, rectangular base for supporting a navigational strip-chart,
   b. a relatively soft surface-material receptive to marker pins, attached to the top of the base, and covering a substantial portion thereof,
   c. two pairs of L-shaped brackets, each pair attached to the base in facing relation at one pair of opposite sides of the base,
   d. a rod rotatably mounted on each pair of brackets,
   e. means on each rod to hold the ends of a navigational strip-chart for rolling the chart from one rod to the other,
   f. two retainers intermediately attached respectively at the other pair of opposite sides of the base,
   g. the retainers having portions to overlap exposed portions of the navigational chart, to keep it lying flat on the soft surface material,
   h. the retainers undercut to allow the navigational chart to slide freely under them,
   i. the retainers extending toward each other over the base,
   j. a navigational strip-chart engaged at opposite ends by the means on each rod to hold the ends of the navigational strip-chart, and unrolled from the bottom of each rod toward the bottom of the other rod, and the navigational strip-chart resting closely on the soft surface material,
   k. the retainers being transparent for enabling viewing of all of the portions of the chart under the retainers whereby any portion of the navigational strip-chart may be moved from rod to rod by rotating the rods, exposing preselected portions to view, to enable the plotting, marking or pinning of such navigational course continuously on successive portions of the navigational chart as the pins are removed to permit a successive portion of the chart to be exposed.

* * * * *